United States Patent
Xu et al.

(10) Patent No.: US 11,506,478 B2
(45) Date of Patent: Nov. 22, 2022

(54) THREE DIMENSIONAL (3D) IMAGING USING OPTICAL COHERENCE FACTOR (OCF)

(71) Applicant: California Institute of Technology, Pasadena, CA (US)

(72) Inventors: Jian Xu, Pasadena, CA (US); Changhuei Yang, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 17/101,094

(22) Filed: Nov. 23, 2020

(65) Prior Publication Data

US 2021/0156671 A1    May 27, 2021

Related U.S. Application Data

(60) Provisional application No. 62/941,221, filed on Nov. 27, 2019.

(51) Int. Cl.
| | |
|---|---|
| G01B 11/06 | (2006.01) |
| G06T 11/00 | (2006.01) |
| G01B 9/02 | (2022.01) |

(52) U.S. Cl.
CPC ...... *G01B 11/0608* (2013.01); *G01B 9/02043* (2013.01); *G06T 11/005* (2013.01); *G06T 2207/10101* (2013.01)

(58) Field of Classification Search
CPC ............ G01B 9/02032; G01B 9/02043; G01B 9/02084; G01B 9/021; G01B 11/0608; G06T 11/005

See application file for complete search history.

(56) References Cited

U.S. PATENT DOCUMENTS

| | | | |
|---|---|---|---|
| 10,948,284 B1* | 3/2021 | Chalmers | G01B 11/0608 |
| 2002/0101593 A1* | 8/2002 | Yang | A61B 5/0059 |
| | | | 356/484 |
| 2011/0134408 A1* | 6/2011 | Kuramoto | G03F 7/7085 |
| | | | 355/67 |
| 2017/0016835 A1* | 1/2017 | Barak | G01B 9/02007 |

OTHER PUBLICATIONS

Huang, D., et al., Optical Coherence Tomography, Science, Nov. 1991, pp. 1178-1181, vol. 254, No. 5035.

(Continued)

*Primary Examiner* — Michael A Lyons
(74) *Attorney, Agent, or Firm* — Gates & Cooper LLP

(57) ABSTRACT

A 3-D imaging system including a computer determining a plurality of coherence factors measuring an intensity contrast between a first intensity of a first region of an interference comprising constructive interference between a sample wavefront and a reference wavefront, and a second intensity of a second region of the interference comprising destructive interference between the sample wavefront and the reference wavefront, wherein the interference between a reference wavefront and a reflection from different locations on a surface of an object. From the coherence factors, the computer determines height data comprising heights of the surface with respect to an x-y plane perpendicular to the heights and as a function of the locations in the x-y plane. The height data is useful for generating a three dimensional topological image of the surface.

21 Claims, 9 Drawing Sheets

(56) References Cited

OTHER PUBLICATIONS

Wang, Z., et al., "Cubic meter vol. optical coherence tomography", Optica, Dec. 2016, pp. 1496-1503, vol. 3, No. 12.
Geng, J., "Structured-light 3D surface imaging: a tutorial", Advances in Optics and Photonics, 2011, pp. 128-160, vol. 3.
Ng, R., et al., "Light Field Photography with a Hand-held Plenoptic Camera", Stanford Tech Report CTSR 2005-02, pp. 1-11.
Levoy, M., et al., "Light Field Microscopy", ACM SIGGRAPH 2006 Papers, SIGGRAPH 2006, pp. 924-934.
Antipa, N., et al., "DiffuserCam: lensless single-exposure 3D imaging", Optica, Jan. 2018, pp. 1-9, vol. 5, No. 1.
Asif, M.S., et al., "FlatCam: Replacing Lenses with Masks and Computation", 2015 IEEE International Conference on Computer Vision Workshops, 2015, pp. 663-666.
Levin, A., et al., "Image and Depth from a Conventional Camera with a Coded Aperture", Proceedings of the ACM SIGGRAPH Conference on Computer Graphics, 2007, pp. 1-9.
Pavani, S.R.P., et al.,"Three-dimensional, single-molecule fluorescence imaging beyond the diffraction limit by using a double-helix point spread function", PNAS, Mar. 2009, pp. 2995-2999, vol. 106, No. 9.
Llull, P., et al., "Image translation for single-shot focal tomography", Optica, Jul. 2014, pp. 1-6, vol. 1, No. 1.
Takeda, M., et al., "Fourier-transform method of fringe-pattern analysis for computer-based topography and interferometry", J. Opt. Soc. Am., Jan. 1982, pp. 156-160, vol. 72, No. 1.
Xu, J., et al., "Single-shot surface 3D imaging by optical coherence factor", Optics Letters, Apr. 2020, pp. 1734-1737, vol. 45, No. 7.

\* cited by examiner

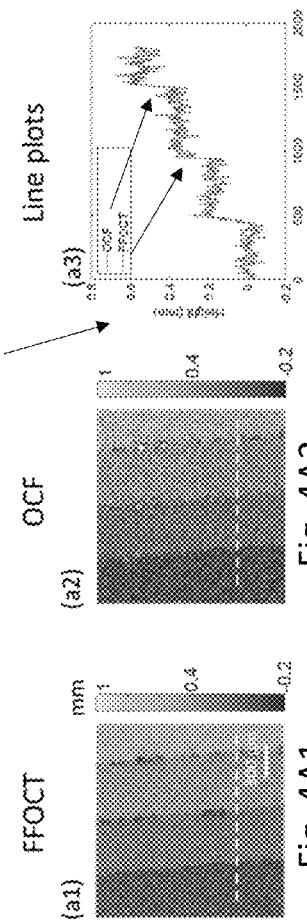

THREE DIMENSIONAL (3D) IMAGING USING OPTICAL COHERENCE FACTOR (OCF)

CROSS REFERENCE TO RELATED APPLICATIONS

This application claims the benefit under 35 U.S.C. Section 119(e) of and commonly-assigned U.S. Provisional Patent Application Ser. No. 62/941,221, filed on Nov. 27, 2019, by Jian Xu and Changhuei Yang, entitled "3D Imaging using optical coherence factor (OCF)," (CIT-8400); which application is incorporated by reference herein.

BACKGROUND OF THE INVENTION

1. Field of the Invention

The present disclosure relates to imaging systems and methods of imaging.

Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Since real world objects are three dimensional (3D) in nature while common image sensors are two dimensional (2D), optical researchers have worked extensively on different methods to use the captured low dimensional data to reconstruct 3D images. It is worth noting that real world scenes generally consist of multiple surfaces instead of dense 3D voxels, because light usually only interacts with the surface of an object. Under this condition, 3D imaging can be recast as a height-measurement problem (topographic scenarios) and the imaging results are usually topographical in height direction (z-direction).

A variety of methods have been developed to realize 3D imaging from 2D data, including optical coherence tomography (OCT) [1,2], structured light illumination [3], light field cameras [4,5], lensless cameras [6,7] and point spread function (PSF) engineering [8-10]. Some of the 3D imaging methods such as OCT [1,2] inherently reconstruct 3D voxels. For topographic scenarios, this type of 3D imaging methods are generally inefficient as the inherent information in such scenes are much more constrained and lower in magnitude. The other aforementioned methods—from structured light illumination to PSF engineering—can take advantage of or even rely on the topography condition. Structured light illumination methods [3] usually require a set of spatially varying illumination patterns on the surface of the object, and the height information can be inferred from the distortion of the projected patterns. However, there will be ambiguities in the reconstructed height profile if the object surface has certain amount of discontinuity. In addition, structured light illumination requires precise calibration before data acquisition. Light field cameras [4,5] are able to capture both 2D space and 2D angle information to realize 3D reconstruction in a single shot, but all of them must trade off space-bandwidth products (effective voxels). Lensless cameras [6,7] replace the conventional image lenses in front of the sensor with an encoding element, such as an amplitude mask or even a random diffuser, and computationally reconstruct the 3D image from the recorded pattern. PSF engineering methods [8-10] implement coded pupils such that objects at different heights have different PSF on the image sensor. The height information is inferred from the extent of blurring across the scene by computational methods. Both lensless cameras and PSF engineering methods require non-trivial algorithms to reconstruct the height information from the recorded patterns.

From a more fundamental level, these 3D imaging methods can be classified in different categories based on the approach by which they convert height information into detectable signals. OCT encodes the height information to coherence profile, structured light illumination encodes it to pattern distortion, and light field imaging, lensless cameras and PSF engineering methods encode it to the corresponding 2D patterns based on the optical system. However, these existing 3D imaging methods require either multiple 2D image frames, or a single frame image but complicated algorithms. What is needed, then, are improved methods for 3D imaging. The present disclosure satisfies this need.

SUMMARY OF THE INVENTION

The present disclosure describes an apparatus useful in a three dimensional (3D) imaging system. The apparatus can be embodied in many ways including, but not limited to, the following.

1. An apparatus including means for interfering a reference wavefront with a sample wavefront comprising a reflection from different locations on a surface of an object, so as to form a interference comprising an intensity distribution having an intensity contrast (e.g., interference fringe visibility or interference fringe contrast) varying as a function of path length differences between the different locations on the surface and the reference wavefront. The apparatus further includes a computer determining: (1) from the intensity distribution, one or more coherence factors (e.g., a measure of the intensity contrast), and (2) from the coherence factors, height data comprising heights of the surface with respect to an x-y plane (perpendicular to the heights) as a function of the coordinates of the locations in an x-y plane. The heights are useful for generating a three dimensional (e.g., topographical) image of the surface.

2. The apparatus of example 1, wherein the means for interfering comprises at least one of an imaging system or an interferometer.

3. The apparatus of example 1 or 2, further comprising a camera or an imaging sensor recording the intensity distribution.

4. The apparatus of any of the examples 1-3, wherein the means for interfering comprises an imaging system including an image sensor capturing the intensity distribution as a function of the different locations at different positions on the image sensor; a source of coherent electromagnetic radiation; and optical elements (1) splitting the coherent electromagnetic radiation into a sample beam comprising the sample wavefront and a reference beam comprising the reference wavefront, (2) matching path lengths traveled by the sample beam and the reference beam so as to form the intensity distribution (e.g., comprising interference fringes), and (3) guiding and collecting the sample wavefront and the reference wavefront onto the image sensor.

5. The apparatus of any of the examples 1-4, wherein: the means for interfering obtains a coherence profile comprising the coherence factors when the surface comprises a flat surface of a mirror, the flat surface including the x-y plane and the coherence factors including source coherence factors each comprising a measure of the intensity contrast as a function of the path length differences from the x-y plane to the reference wavefront as a function of position of the x-y plane along the optical axis of the sample wavefront;

the means for interfering obtains the coherence factors when the surface comprises a non-planar surface of the object, the coherence factors comprising sample coherence factors comprising a plurality of values; and the computer determines the height data by:

locating the values of the sample coherence factors in the coherence profile and selecting a set of the path length differences associated with each of the plurality of values according to the coherence profile; and obtaining the height data from the set of the path length difference (e.g., setting the heights as being equal to the set of the path length differences).

6. The apparatus of any of the examples 1-5, wherein:

the interference comprises DC terms and an interference term, and the computer:

determines a Fourier transform of the interference, identifies a portion of the Fourier transform associated with the interference term, converts the portion into the interference term, and calculates the coherence factors by dividing the interference term by a divisor associated with a first intensity of the sample wavefront and a second intensity of the reference wavefront collected on the image sensor.

7. The apparatus of any of the examples 1-6, wherein:

the sample wavefront and the reference wavefront are generated from a single pulse of the coherent electromagnetic radiation, and the three dimensional image is formed from a single frame or snap-shot of the first interference obtained from the single pulse.

8. The apparatus of any of the examples 1-7, wherein:

the imaging system has a depth of view and a field of view, the sample wavefront and the reference wavefront are generated from coherent electromagnetic radiation having a coherence length matching or commensurate with the depth of view so that all the heights are within the depth of view, the path length differences are all negative or all positive so that the field of view is entirely within a monotonic region of the coherence profile, and a contribution to the intensity contrast caused by a tilt between the sample wavefront and the reference wavefront is removed by removing a slope of constant gradient from the height data.

9. The apparatus of any of the examples 1-8, further comprising a display displaying the 3D image.

10. The device of any of the claims 1-9, wherein the computer or the circuit comprises at least one of a single chip comprising a processor, an application specific integrated circuit, or a field programmable gate array.

Obtaining 3D profiles of targeted objects can be helpful in many areas. OCF imaging provides a useful solution with novel but effective architectures. The single-shot and computationally efficient properties, which yield high throughputs, have potential applications for industrial quality control inspection.

BRIEF DESCRIPTION OF THE DRAWINGS

Referring now to the drawings in which like reference numbers represent corresponding parts throughout:

FIGS. 4A1-4C3. Quantitative height reconstruction results of FIG. 4A1-C1 shows FFOCT, FIG. 4A2-4C2 shows OCF and FIG. 4A3-C3 shows 1D line plots of the white dashed lines in (FIG. 4A1-FIG. 4C1) and (FIG. 4A2-FIG. 4C2).

FIG. 5A shows coherent imaging, FIG. 5B shows incoherent imaging, FIG. 5C shows OCF, and FIG. 5D shows Line plots of blue and red dashed lines in (b) and (c). The mean values in A1 and B1 are 0.59 and 0.60, respectively. The mean values in A2 and B2 are 0.38 and 0.17, respectively.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

The present disclosure describes a single-shot 3D imaging method, named optical coherence factor (OCF) imaging, which converts the height information into a coherence profile, i.e., different heights provide different coherence factors. We first introduce and explain the OCF imaging approach. Next, we report experimental height reconstruction results from OCF collected with our prototype and showed that the results are well matched with images acquired with an axial scanning full field OCT (FFOCT) system. We then demonstrate that OCF is able to provide additional height information than conventional incoherent imaging methods. Finally, we discuss the advantages and tradeoffs of OCF over conventional height reconstruction methods.

Figure 1:
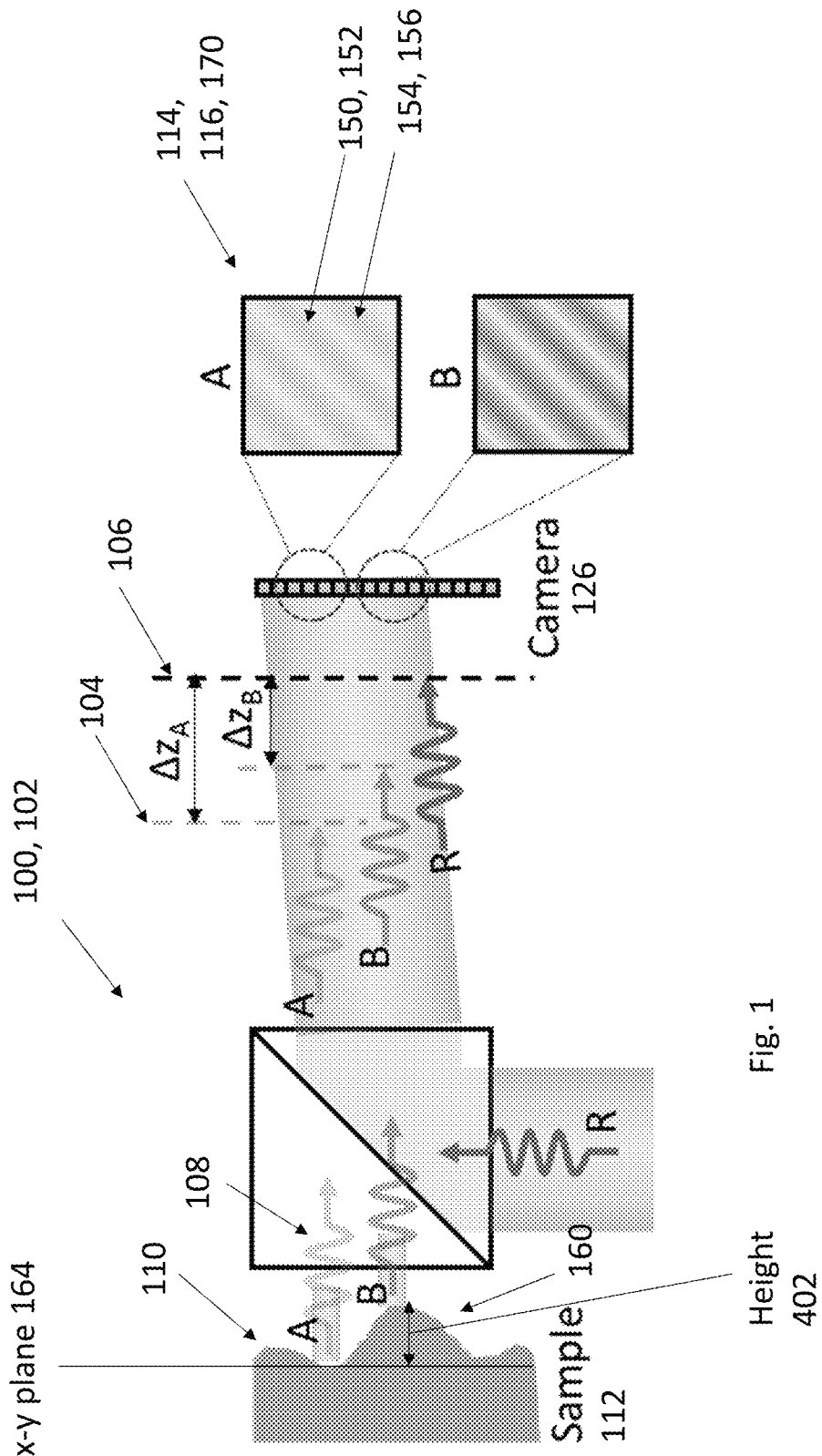
FIG. 1. Working principle of OCF. The reference beam and sample beam with a pathlength difference $\Delta z$ ($\Delta z_A$ or $\Delta z_B$) will create interference fringes on the camera with the fringe visibility corresponding to $\Delta z$. The height information is then inferred from the fringe visibility. Illumination arm for the sample is omitted for simplicity.
Figure 2:
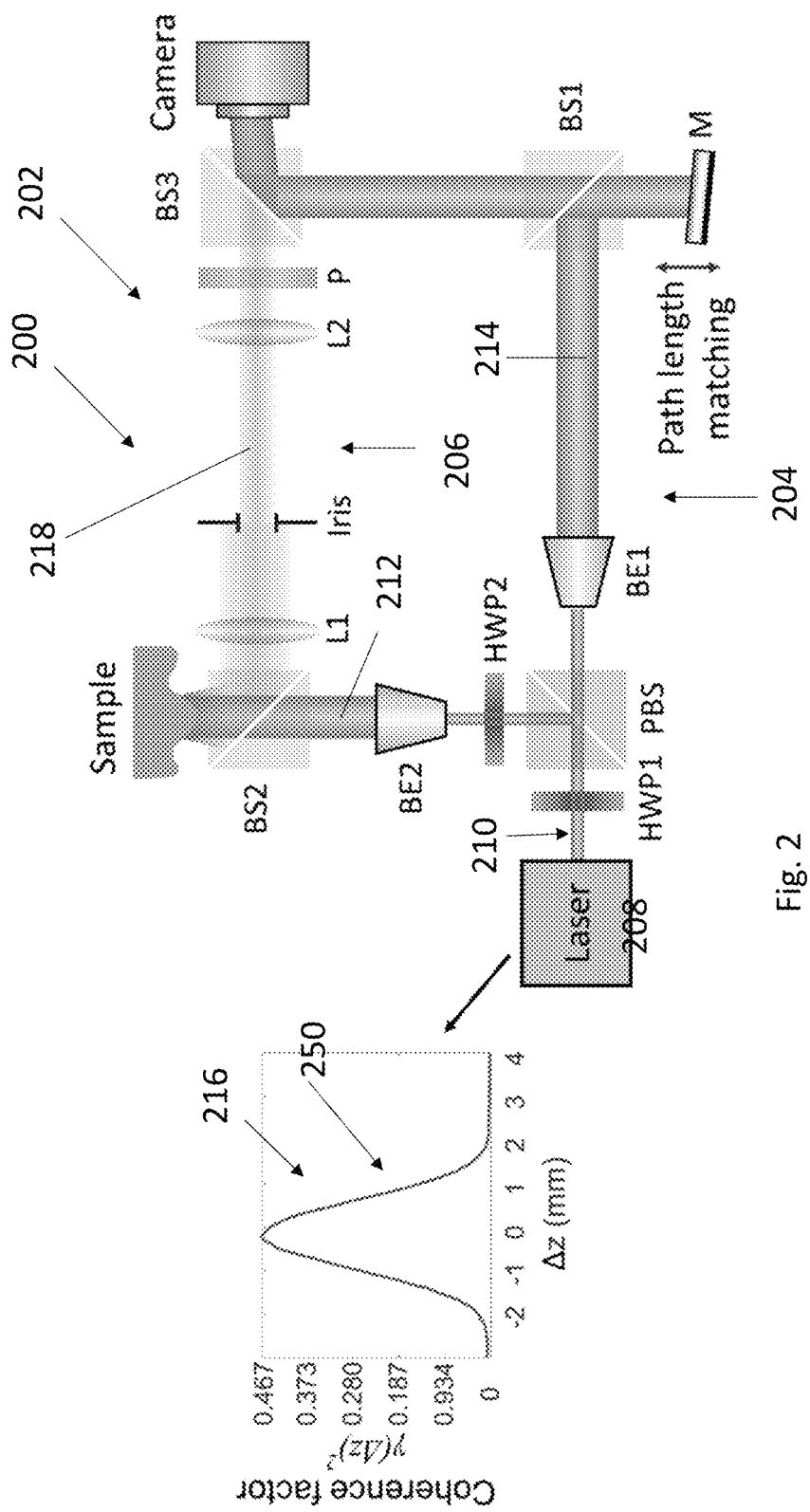
FIG. 2. Schematic of the optical system. BE, beam expander; BS, beam splitter; HWP, half wave plate; L, lens; M, mirror; P, polarizer. Inset: the laser coherence P with respect to a pathlength mismatch $\Delta z$.

FIG. 1 shows the working principle of OCF. The sample beam reflected from the sample surface (illumination optics omitted) interferes with a reference beam with a pathlength difference $\Delta z$. The interference fringes on the camera have different fringe visibility depending on the pathlength difference: Comparing to part B, part A has more pathlength difference with the reference beam R, therefore the fringe visibility is lower. Mathematically, we can introduce a coherence factor γ(Δz) into the interference, and the image on the camera reads as:

$$I(r)=|E_r(r)|^2+|E_s(r)|^2+2\gamma(\Delta z)E_r(r)E_s(r)\cos(k\cdot r+\phi_r(r)-\phi_s(r))) \quad (1)$$

where r=(x,y) is the pixel location on the camera; k is the wave vector of the reference beam; $E_r$, $\phi_r$ and $E_s$, $\phi_s$ are the amplitudes, phases of the reference beam and sample beam, respectively, and γ(Δz) is the coherence factor when the pathlength difference is Δz. Equivalently, γ(Δz) is the coherence profile of the laser (FIG. 2 inset). The form of Eq. (1) makes an assumption that the coherence factor in a local area is a constant. Therefore, the interference term is scaled by the coherence factor. It should be noted that the pathlength difference comes from two sources: 1) height variations from the sample and 2) the relative tilt between the sample beam and reference beam. The former one reflects the spatial information of the sample, while the latter one only adds a slope on the reconstructed height image. Since the incidence angle of the reference beam can be deduced from the periodicity of the interference fringes, we can computationally remove the slope in the height reconstruction. As γ(Δz) is symmetric with respect to Δz, we set the pathlength difference always positive or negative within the DoF such that the whole field of view (FoV) falls in the monotonic part of the coherence profile. It should be noted that this single shot method relies on the topographical condition, which means that the scenes only consist of surfaces, so that each coherence factor unambiguously maps to one height according to the calibrated coherence profile of the light source (FIG. 2 inset). The quantitative height result can be found from a lookup table of pathlength differences and coherence factors that were previously quantified and tabulated.

EXAMPLE

An example experimental setup of OCF is shown in FIG. 2. The laser beam (532 nm, 150 mW, CrystaLaser Inc. USA) is first split into two arms by a polarizing beam splitter (PBS). Light on arm R1 serves as the reference beam and light on arm R2 illuminates the sample. The sample is imaged onto the camera (GX1920, Allied Vision) by a 4-f system. A tilted plane wave (R1) is added on the camera by BS3 and interferes with light from arm R1, creating an off-axis hologram on the camera. We perform pathlength difference adjustments on R1 such that 1) the pathlength difference between the two arms is in the monotonic region of the laser coherence profile, and 2) the whole scene in DoF interferes with the reference beam. The coherence factor is retrieved from the hologram by using off-axis holography [11]. The coherence profile of the laser was characterized before imaging experiments. To measure the coherence profile, we put a mirror as the sample, and axially scanned the reference mirror M to acquire multiple frames of interference fringes. A subarea of each frame was analyzed to obtain the coherence factor. The coherence profile in the FIG. 2 inset consists of the correspondence between the coherence factor and pathlength difference.

Figure 3:
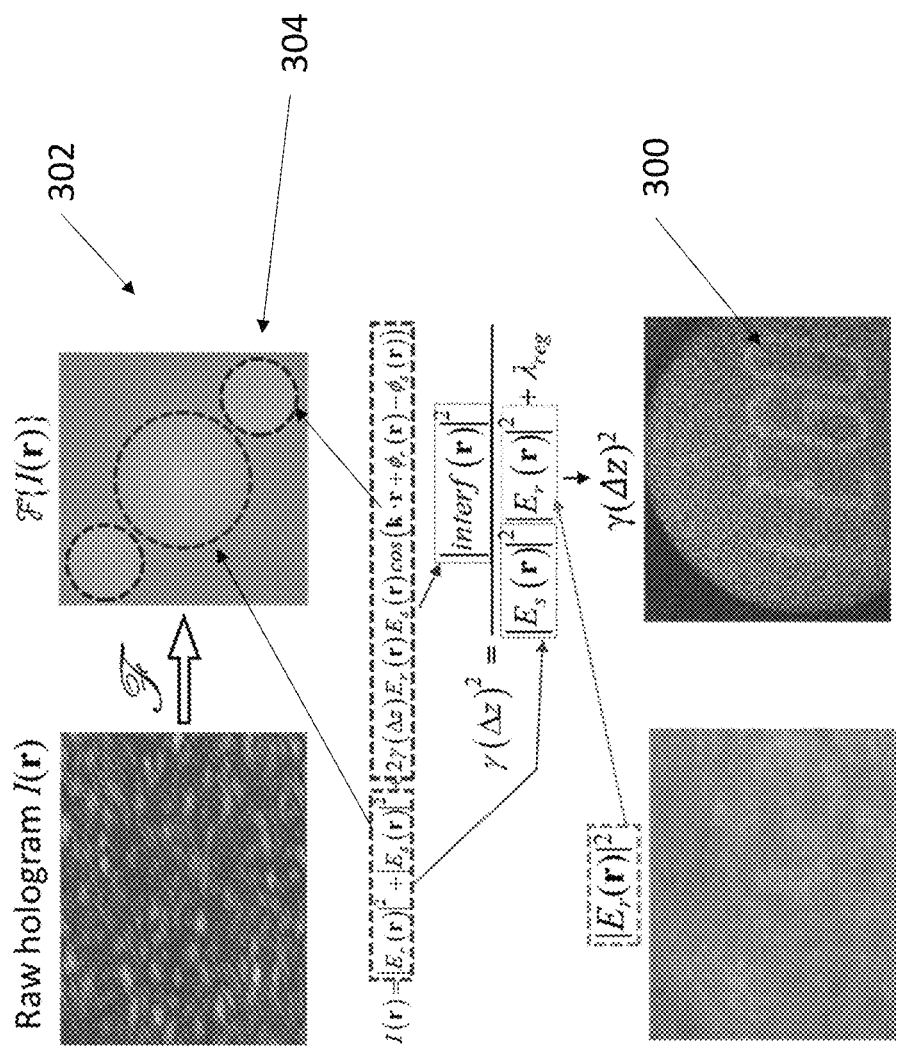
FIG. 3. Flow chart of OCF image processing. The three terms from Eq. 1 are calculated from the hologram (pink and red enclosed boxes) and pre-calibrated reference beam (green box). The coherence factor is then calculated.

Since a 4-f system was used to image the sample onto the camera sensor, $E_r(r)$ here is the electric field component of the reference light that is interfering with the sample reflection from location r on the sample surface. An iris was put on the Fourier plane of the 4-f system such that the spatial frequency components of the DC term $|E_s(r)|^2$ do not overlap with the interference term (3rd term in Eq. 1). The Fourier transform of the captured hologram is shown in FIG. 3(F{I(r)}). The central lobe is the Fourier transform of the DC terms $|E_r(r)|^2$ and $|E_s(r)|^2$ (first two terms in Eq.1), and the two side lobes are the Fourier transform of the interference term ($3^{rd}$ term in Eq. 1). Since the interference term is separated in Fourier domain with the DC terms, we can crop it out, shift it back to the center and do inverse Fourier transform to get one copy of the conjugate pair $$\text{interf}(r)=E_r(r)E_s(r)\gamma(\Delta z)\exp(-i(\phi_r(r)-\phi_s(r))). \quad (2)$$

The coherence factor is calculated by $$\gamma(\Delta z)^2=|\text{interf}(r)|^2/(|E_r(r)|^2|E_s(r)|^2+\lambda reg) \quad (3),$$

where $\lambda_{reg}$ is the regularization term. Theoretically, if we rewrite Eq. (2), we will find $\lambda_{reg}$ is zero. In practice, to avoid division by zero (this happens when $|E_s(r)|^2$ is approximately zero), $\lambda_{reg}$ is set to be above the noise level in the hologram measurement. We set $\lambda_{reg}$ equal to the camera pixel value of 50. In the experiment, the reference beam intensity $|E_r(r)|^2$ is pre-calibrated, and the sample beam intensity $|E_s(r)|^2$ is calculated by subtracting $|E_r(r)|^2$ from the inverse Fourier transform of the central lobe. After getting the coherence factor information $\gamma(\Delta z)^2$, the height value is read from a pre-calibrated laser coherence profile (FIG. 2 inset).

FIG. 4 demonstrates the quantitative height reconstruction results of OCF. We stacked pieces of coverslips together in a step shape, where each piece had a thickness of 200 μm. The coverslips were sprayed by white paint to avoid multiple reflections from glass surfaces. The OCF quantitative height reconstruction result of the coverslip stack is present in FIG. 4A2. An axial scanning FFOCT result serving as ground truth is shown in FIG. 4A1. For FFOCT, we scanned the reference mirror and took multiple holograms, then determined the height by looking at the maximum interference coherence factor. The OCF and ground-truth FFOCT results are closely matched with each other, as exhibited in the line plot FIG. 4A3.

We then used OCF to image the 3D-printed samples (3D printer model number CraftUnique CraftBot Plus) with a given printing resolution of 100 μm (FIG. 4B and FIG. 4C). In FIG. 4B3, the 100 μm step is clearly seen in the line plot. FIG. 4C illustrates the imaging results of a 3D-printed hand model.

Figure 5A:
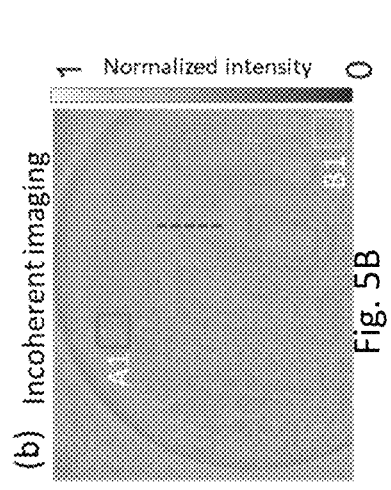
FIGS. 5A-5D. Comparison on different imaging modalities.
Figure 5B:
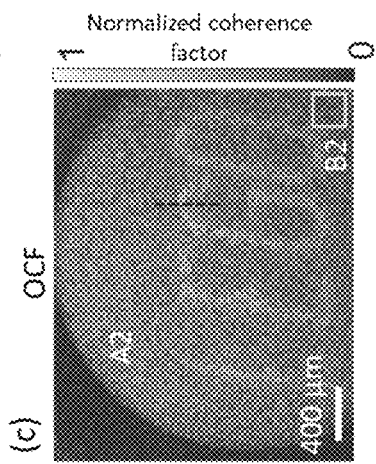
Figure 5C:
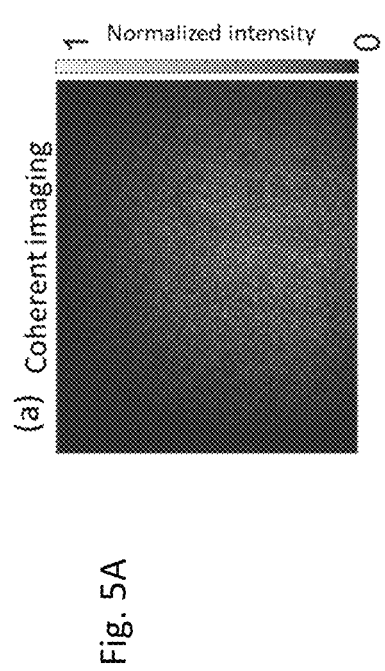
Figure 5D:
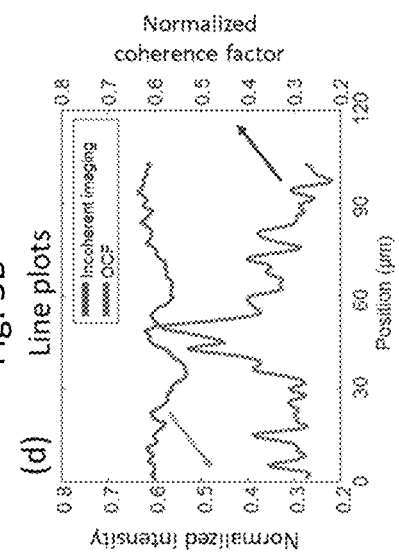

Using the same imaging system, we then imaged the same test objects with different imaging modalities, showing that OCF provides a different imaging contrast mechanism in comparison to conventional coherent or incoherent imaging. FIG. 5A-5C shows the imaging results of coherent imaging, incoherent imaging and OCF, respectively. Speckle noise is dominant in coherent imaging and can overwhelm the features of the sample. Both incoherent imaging and OCF are able to reveal the feature information of the sample. In the incoherent imaging, the intensity values are uniform among the FoV, but relatively lower at the edges of the test object as more light is scattered. Unlike incoherent imaging, OCF maps the coherence factor that is related to the height instead of feature edges, since different height provides different pathlength mismatch and yields different fringe visibility in the hologram. In FIG. 5D, we show the line plots indicated by the blue and red lines in FIG. 5B,5C, respectively. OCF imaging is directly tied to the height itself since different heights result in different coherence factors, while incoherent imaging reveals the edge information of the feature (the feature has a similar intensity value as the surrounded background, with two dips at the edge of the feature). Furthermore, the sample is put slightly tilted thus the surface is not perpendicular to the optical axis. From OCF, the tilt is shown by different fringe visibility in enclosed square A1 (mean value 0.38) and square B1 (mean value 0.17), while the absolute intensity values (reflectance) in enclosed squares A2 (mean value 0.59) and B2 (mean value 0.60) are similar from incoherent imaging.

As a 3D imaging method, OCF has several advantages over other 3D imaging methods. While OCF and OCT both use interference to determine height information, the mechanism by which they do so are quite different. OCT uses light with optical coherence lengths that are much shorter than the DoF. Therefore, to get the height measurement within the DoF, either time domain or frequency domain sweeping is required, and multiple 2D images are used to calculate one 3D image, which requires longer data acquisition time and more computational resources. On the other hand, OCF uses light with coherence lengths that are comparable to the DOF, and uses the strength of the interference to determine height information. Thus, the entire scenes within the DoF can interfere with the reference beam with varying extents, and the height information is encoded in a single OCF interference hologram. Compared to structured illumination, besides single-shot advantage, OCF does not have to address the phase wrapping problem, to which many efforts have been devoted. In terms of space-bandwidth product (SBP) of the imaging system, OCF does not require as much binning of the camera pixels into image pixels as light field imaging requires. As seen from FIG. 3(F{I(r)}), the two enclosed red circles, which represent the pass band on Fourier domain, occupy ~16% of the total Fourier space. This implies that ~16% of total pixels are effectively used. Unlike lensless cameras or PSF engineering 3D based imaging, which adopt a variety of mathematical models and computational algorithms, OCF is more computational efficient since it only requires a single 2D Fourier transform.

In the examples presented herein, the coherence length of the light source is ~2 mm, which is similar to the DoF of the imaging system. However, the principle of OCF can be applied to measure a broader range of heights, from microns to meters, by selection of a light source with a suitable coherence length. The imaging system can then be designed accordingly.

In summary, we have demonstrated an example of single-shot 3D surface imaging using OCF. The experimental results show that it is viable for quantitative height measurement. Using the same imaging system, we also show that OCF has a different imaging contrast mechanism than conventional imaging modalities including coherent imaging and incoherent imaging. The contrast mechanism of OCF is able to reveal some information that is not provided by the conventional imaging modalities. The use of OCF offers a novel and effective solution for surface profile reconstruction having applications for industrial quality control inspection due to its single-shot property.

Process Steps

Method of Making

Figure 6A:
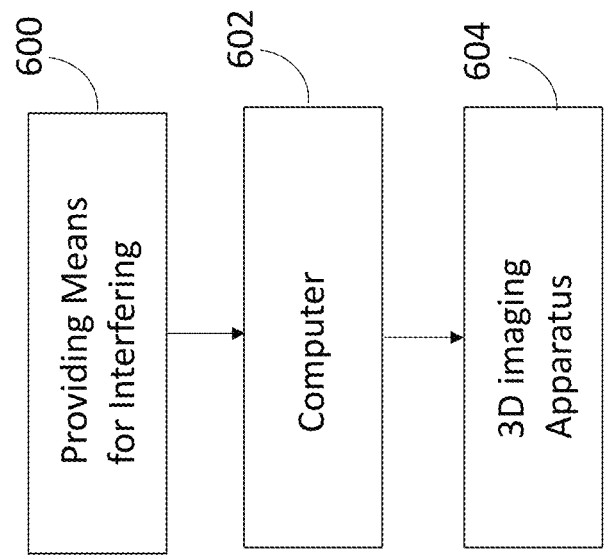
FIG. 6A. Flowchart illustrating a method of making a 3-D imaging apparatus.

FIG. 6A illustrates a method of making an apparatus useful for 3-D imaging.

Block 600 illustrates optionally providing and/or assembling means for interfering 102 a reference wavefront 106 with a sample wavefront 104 comprising a reflection 108 from different locations A, B, on a surface 110 of an object 112, so as to form an interference 114 comprising an intensity distribution 116 having an intensity contrast varying as a function of path length differences $\Delta z_A$, $\Delta z_B$ between the different locations A, B, on the surface 110 and the reference wavefront 106. Example means for interfering 102 include, but are not limited to, at least one of an imaging system 200, an interferometer 202 including a reference arm 204 transmitting the reference wavefront and a sample arm 206 transmitting the sample wavefront, a camera, or an imaging sensor 126 (e.g., comprising pixels), or statutory equivalents thereof.

In one OCF example, a 4-f imaging system images the light field reflected from the surface of the object to the image sensor. A plane wave reference beam is added in front of the image sensor and interferes with the light field from the object. The illumination of the imaging system comes from a laser source with the optical coherence length comparable to the depth of field (DoF) of the optical system. In this case, all the scenes within the DoF can interfere with the reference beam. Different locations in the field of view with different heights have different optical path length difference from the reference beam and therefore different interference fringe contrasts. The height information is determined from the fringe contrasts Block 602 represents connecting a computer to the means for interfering. The computer is configured to determine to following.

(1) From intensity data comprising the intensity distribution, one or more coherence factors $\gamma(\Delta z)$ as a function of the different locations A, B. The coherence factors comprise an intensity contrast between one or more first intensities 150 of one or more first regions 152 of the interference comprising constructive interference between the sample wavefront and the reference wavefront, and one or more second intensities 154 of one or more second regions 156 of the interference comprising destructive interference between the sample wavefront and the reference wavefront. In one or more examples, the coherence factors comprise a measure of the intensity contrast comprising fringe visibility or fringe contrast of interference fringes in the interference or between bright spots and dark regions in the interference comprising a speckle distribution.

(2) From the coherence factors, height data 400 comprising heights 402 of the surface with respect to an x-y plane 164 perpendicular to the heights and as a function of the coordinates of the locations in the x-y plane, wherein the height data is useful for generating a three dimensional image 404 of the surface 110.

Block 604 represents the end result, an apparatus or device useful for 3-D imaging.

The apparatus or device can be embodied in many ways including, but not limited to, the following.

1. An apparatus 100 including means for interfering 102 the sample wavefront 104 and the reference wavefront 106 to form the interference 114; and a computer 802 determining the height data from the coherence factors. As illustrated herein, the sample wavefront 104 comprises a reflection 108 from different locations A, B, on a surface 110 of an object 112 and the interference 114 comprises an intensity distribution 116 having an intensity contrast varying as a function of path length differences $\Delta z$ between different locations A, B, on the surface 110 and the reference wavefront;

2. The apparatus of example 1, wherein the means for interfering comprises at least one of an imaging system 118 or an interferometer 120.

3. The apparatus of example 1 or 2, further comprising a camera or an imaging sensor 126 recording the intensity distribution 116.

4. The apparatus of any of the examples 1-3, wherein the means for interfering comprises an imaging system 118 including an image sensor 126 capturing the intensity distribution 116 as a function of the different locations A, B, at different positions r=(x,y) on the image sensor; a source 208 (e.g., laser) of coherent electromagnetic radiation 210; and optical elements (1) (e.g., a beampslitter PBS) splitting the coherent electromagnetic 210 radiation into a sample beam 212 comprising the sample wavefront and a reference beam 214 comprising the reference wavefront 106, (2) (e.g., a mirror M) matching path lengths traveled by the sample beam and the reference beam so as to form the intensity distribution comprising interference fringes 170, and (3) (e.g., one or more lenses L1, L2) guiding and collecting the sample wavefront and the reference wavefront onto the image sensor (or statutory equivalents thereof).

Figure 6B:
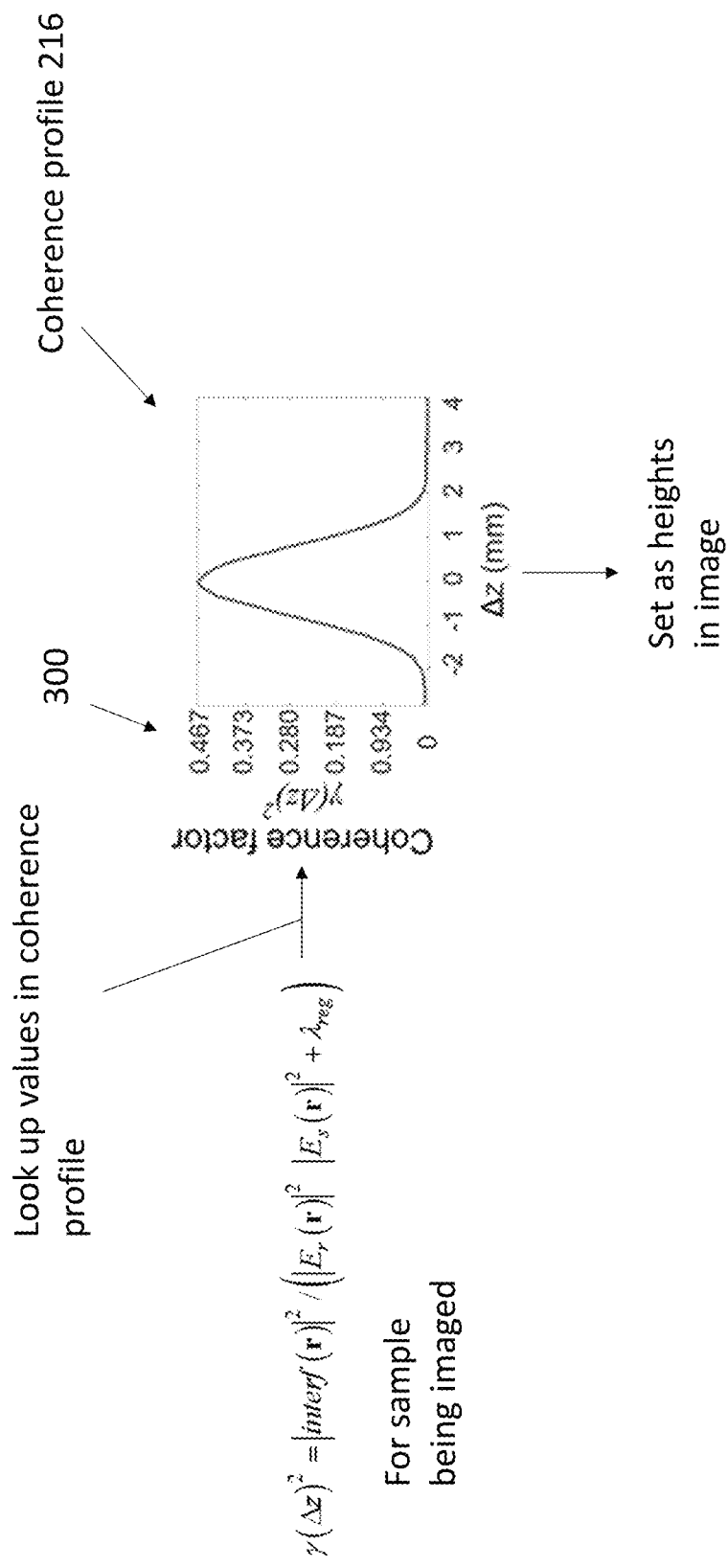
FIG. 6B. Looking up the height data from the coherence profile.

5. The apparatus of any of the examples 1-4, further comprising a computer 802 or controller instructing:

the means for interfering to obtain a coherence profile 216 comprising the coherence factors when the surface 110 comprises a flat surface of a mirror, the flat surface including the x-y plane 164 and the coherence factors including source coherence factors each comprising a measure of the intensity contrast as a function of the path length differences from the x-y plane to the reference wavefront as a function of position of the x-y plane along the optical axis 218 of the sample beam comprising the sample wavefront;

the means for interfering to obtain the coherence factors when the surface comprises a non-planar surface 160 of the object (the object being imaged or scanned), the coherence factors comprising sample coherence factors $\gamma(\Delta z)^2$ comprising a plurality of values 300; and wherein the computer determines the height data by:

locating the values 300 of the sample coherence factors in the coherence profile 216 and selecting a set of the path length differences $\Delta z$ associated with each of the plurality of values according to the coherence profile (as illustrated in FIG. 6B); and obtaining the height data 400 from the set of the path length differences (e.g., setting the heights as being equal to the set of the path length differences).

6. The apparatus of any of the examples 1-5, wherein:

the interference comprises DC terms and an interference term, and the computer:

determines a Fourier transform 302 of the interference, identifies a portion 304 of the Fourier transform associated with the interference term, converts the portion into the interference term interf(r), and calculates the coherence factors by dividing the interference term by a divisor associated with a first intensity of the sample wavefront and a second intensity of the reference wavefront collected on the image sensor, for example:

$$\gamma(\Delta z)^2 = |\text{interf}(r)|^2/(E_r(r)|^2|E_s(r)|^2 + \lambda_{reg}).$$

7. The apparatus of any of the examples 1-6, wherein:

the sample wavefront and the reference wavefront are generated from a single pulse of coherent electromagnetic radiation 210, and the three dimensional image 404 is formed from a single frame or snap-shot of the interference 406 obtained from the single pulse.

8. The apparatus of any of the examples 1-7, wherein:

the imaging system 118 has a depth of view (DoF) and a field of view (FoV), the sample wavefront and the reference wavefront are generated from coherent electromagnetic radiation having a coherence length matching or commensurate with the depth of view so that the heights are within the depth of view, the path length differences are all negative or all positive so that the field of view is entirely within a monotonic region 250 of the coherence profile 216, and a contribution to the interference caused by a tilt between the sample wavefront and the reference wavefront is removed by removing a slope of constant gradient from the height data.

9. The apparatus of any of the examples 1-8, further comprising a display 816 displaying the 3D image.

10. The apparatus of any of the examples 1-9, wherein the computer or the circuit comprises at least one of a single chip comprising a processor, an application specific integrated circuit, or a field programmable gate array.

11. The apparatus of any of the examples 1-10, wherein the sample wavefront and the reference wavefront comprise the coherent electromagnetic radiation having a wavelength corresponding to ultraviolet, visible, or infrared wavelengths.

12. A computer 802 or one or more circuits determining:

a plurality of coherence factors $\gamma(\Delta z)$ measuring an intensity contrast between a first intensity 150 of a first region 152 of an interference 114 comprising constructive interference between a sample wavefront 104 and a reference wavefront 106, and a second intensity 154 of a second region 156 of the interference 114 comprising destructive interference between the sample wavefront and the reference wavefront, the interference between a reference wavefront and a reflection 108 of the sample wavefront from different locations A,B, on a surface 110 of an object 112, and from the coherence factors, height data 400 comprising heights 402 of the surface 110 with respect to an x-y plane 164 perpendicular to the heights and as a function of the coordinates of the locations in the x-y plane, wherein the height data is useful for generating a three dimensional image 404 of the surface.

13. The apparatus of any of the examples 1-11 including the computer or circuit of example 12.

Method of Operating

Figure 7:
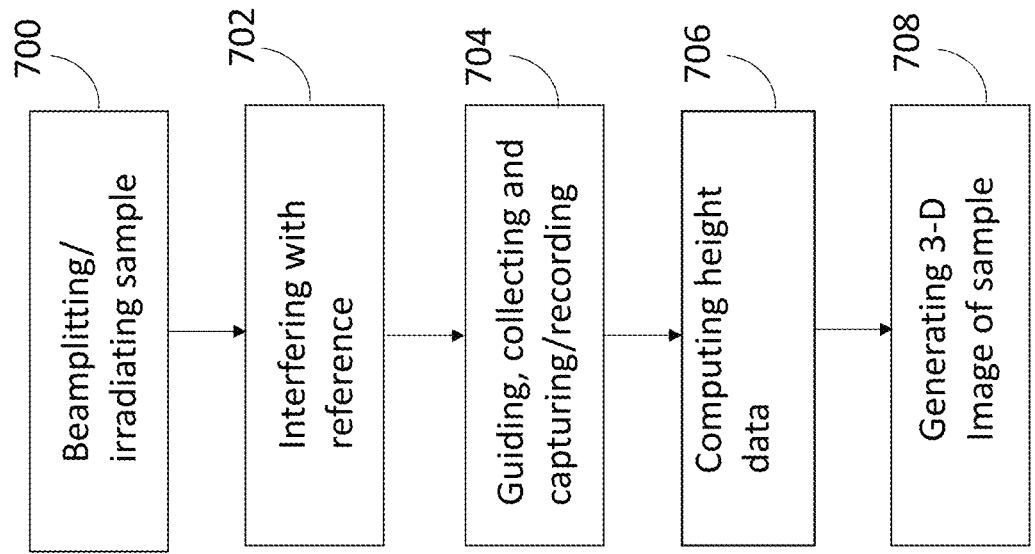
FIG. 7. Flowchart illustrating a method of 3-D imaging.

FIG. 7 illustrates a computer implemented method of imaging using the apparatus of any or the examples described herein.

Block 700 represents splitting coherent electromagnetic radiation into a sample beam comprising the sample wavefront and a reference beam comprising the reference wavefront;

Block 702 represents interfering the sample beam and the reference beam so as to form an interference between the sample wavefront and the reference wavefront. In a calibration example generating a coherence profile, the sample wavefront is reflected from the planar surface of a mirror positioned at the location of the object. The coherence profile may comprise coherence factors as a function of path length difference stored in a graph/graphical form, tabular form, or in a database. In an imaging example, the sample wavefront is reflected from the surface of an object being imaged. The step further comprises matching path lengths traveled by the sample beam and the reference beam so as to form the intensity distribution comprising interference fringes or a speckle distribution.

Block 704 represents guiding and collecting the sample wavefront and the reference wavefront onto an image sensor so as to capture the intensity distribution of the interference as a function of the different locations at different positions on an image sensor. The image sensor (e.g., CCD) may output the intensity distribution as one or more signals read by a computer as intensity data.

Block 706 represents receiving, in a computer, intensity data comprising the intensity distribution of an interference. As described herein, the computer determines, from the intensity data, one or more coherence factors (e.g., measuring intensity contrast) as a function of the different locations. From the coherence factors, the computer determines or calculates height data comprising heights of the surface with respect to an x-y plane perpendicular to the heights and as a function of the locations in an x-y plane, wherein the height data is useful for generating a three dimensional image of the surface.

Block 708 represents optionally generating a 3-D image of the surface using the heights.

The method can be used using the apparatus of any of the examples described herein.

Processing Environment

Figure 8:
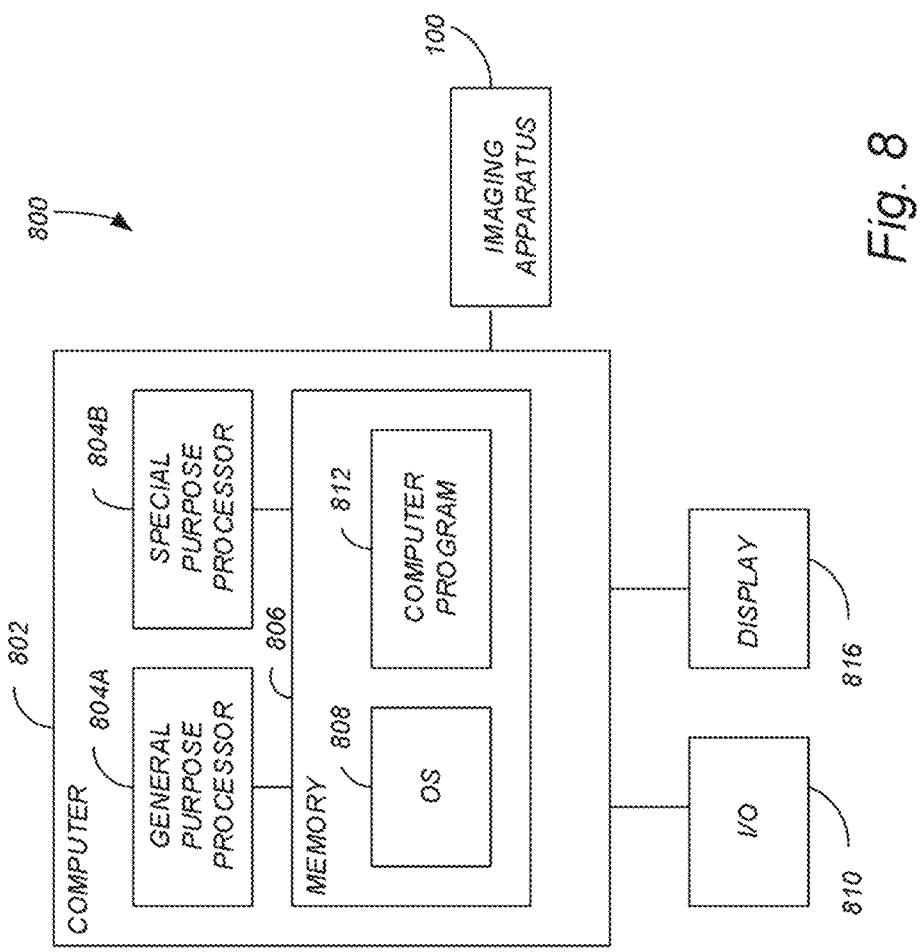
FIG. 8. Schematic of a hardware environment used for processing.

FIG. 8 illustrates an exemplary system 800 comprising a computer 802 used to implement processing elements needed to perform computing and control functions described herein. For example, the computer 800 comprises a circuit or processor determining, from intensity data, height data as a function of different locations on the object. The computer 802 may be a user/client computer, server computer, or may be a database computer and may include peripherals.

The computer 802 comprises a hardware processor 804A and/or a special purpose (hardware) processor 804B (hereinafter alternatively collectively referred to as processor) and a memory 806, such as random access memory (RAM). Generally, the computer 802 operates under control of an operating system 808 stored in the memory 806, and interfaces with the user/other computers to accept inputs and commands (e.g., analog or digital signals) and to present results through an input/output (I/O) module 880 or devices. In one or more examples, I/O module comprises a display, graphics user interface (GUI), a keyboard, a printer and/or a pointing/cursor control device (e.g., mouse). Output/results may be presented on the display 816 or provided to another device for presentation or further processing or action. An image may be provided through a GUI module 818, for example. Although the GUI module 818 is depicted as a separate module, the instructions performing the GUI functions can be resident or distributed in the operating system 808, the computer program 810, or implemented with special purpose memory and processors.

In one or more embodiments, computer 802 may be coupled to, or may comprise, a portable device 832 (e.g., cellular/mobile device, smartphone, or laptop, multi-touch, tablet device, or other internet enabled device) executing on various platforms and operating systems.

In one embodiment, the computer 802 operates by the hardware processor 804A performing instructions defined by the computer program 812 under control of the operating system 808. The computer program application 812 accesses and manipulates data stored in the memory 806 of the computer 802. The computer program 812 and/or the operating system 808 may be stored in the memory 806 and may interface with the user and/or other devices to accept input and commands and, based on such input and commands and the instructions defined by the computer program 812 and operating system 808, to provide output and results.

Some or all of the operations performed by the computer 802 according to the computer program 812 instructions may be implemented in a special purpose processor 804B. In this embodiment, some or all of the computer program 812 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 812 instructions. In one embodiment, the special purpose processor 804B is an application specific integrated circuit (ASIC).

The computer 802 may also implement a compiler 814 that allows an application or computer program 812 written in a programming language such as C, C++, Assembly, SQL, PYTHON, PROLOG, MATLAB, RUBY, RAILS, HASKELL, or other language to be translated into processor 804 readable code. Alternatively, the compiler 814 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 812 accesses and manipulates data accepted from I/O devices and stored in the memory 806 of the computer 802 using the relationships and logic that were generated using the compiler 814.

The computer 802 also optionally comprises an external communication device such as a modem, satellite link, Ethernet card, or other device for accepting input from, and providing output to, other computers 802.

In one embodiment, instructions implementing the operating system 808, the computer program 812, and the compiler 814 are tangibly embodied in a non-transitory computer-readable medium, e.g., data storage device 821, which could include one or more fixed or removable data storage devices, such as a zip drive, floppy disc drive, hard drive, CD-ROM drive, tape drive, etc. Further, the operating system 808 and the computer program 812 are comprised of computer program 812 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 812 and/or operating instructions may also be tangibly embodied in memory 806 and/or data communications devices 830, thereby making a computer program product or article of manufacture according to the invention. As such, the terms "article of manufacture," "program storage device," and "computer program product," as used herein, are intended to encompass a computer program accessible from any computer readable device or media. In one embodiment, the special purpose processor 804B is an application specific integrated circuit (ASIC). Further examples include, but are not limited to, the computer 802 coupled to, or comprising, a server, cloud computing system, personal computer (e.g., desktop computer (e.g., HP Compaq™), portable or media viewing/listening device (e.g., cellular/mobile device/phone, laptop, tablet, personal digital assistant, etc.) or integrated circuit, chip, or field programmable gate array (FPGA). In yet another embodiment, the computer 802 may comprise a multi-touch device, gaming system, or other internet enabled device executing on various platforms and operating systems. In one or more examples, computer 802 or processor 804B comprises a controller or control platform.

FIG. 8 further illustrates the computer included in or coupled to at least one of an imaging system, interferometer, camera, or imaging sensor generating or recording the interference and outputting the first data comprising the intensity distribution used by the computer to determine the coherence factor.

Those skilled in the art will recognize many modifications may be made to this configuration without departing from the scope of the present disclosure. For example, those skilled in the art will recognize that any combination of the above components, or any number of different components, peripherals, and other devices, may be used.

Applications, Advantages, and Improvements 3D imaging, or in other words, depth sensing, has broad applications in areas such as self-driving vehicles, industrial quality control inspection and industrial 3D modeling. Since common image sensors are two dimensional (2D), researchers have worked extensively on different methods to use the captured low dimensional data to reconstruct 3D images. To reconstruct 3D images, the existing 3D imaging methods require either multiple 2D image frames, or a single frame image but complicated algorithms.

It is worth noting that real world scenes generally consist of multiple surfaces instead of dense 3D voxels, because light usually only interacts with the surface of an object. Under this condition, 3D imaging can be recast as a height-measurement problem (topographic scenarios) and the imaging results are usually topographical in height direction (z-direction). Under the topographic scenarios, embodiments described herein provide a single-shot computationally efficient 3D method—optical coherence factor (OCF) imaging—which reduces the amount of data required for 3D reconstruction and improves the computational efficiency.

While we have validated our 3D imaging results comparing them to axial scanning full-field optical coherence images using 3D printed models with topographical height difference at ~1 mm, the principle of OCF imaging can be applied to measure heights of target objects in a broader range of coherence lengths, from microns to meters, by selection of an appropriate light source. The imaging system can then be designed accordingly. In addition, it is not necessary for the imaging system to be a 4-f system. Any imaging system, such as microscopy systems or photography systems, consistent with the principles described herein can accommodate OCF imaging so long a illumination light sources are chosen with appropriate coherence lengths.

REFERENCES

1. D. Huang, E. a Swanson, C. P. Lin, J. S. Schuman, W. G. Stinson, W. Chang, M. R. Hee, T. Flotire, K. Gregory, C. a Puliafito, and J. G. Fujimoto, "Optical Coherence Tomography," Science (80-.). 254, 1178 (1991).
2. Z. Wang, B. Potsaid, L. Chen, C. Doerr, H.-C. Lee, T. Nielson, V. Jayaraman, A. E. Cable, E. Swanson, and J. G. Fujimoto, "Cubic meter volume optical coherence tomography," Optica 3, 1496 (2016).
3. J. Geng, "Structured-light 3D surface imaging: a tutorial," Adv. Opt. Photonics 3, 128 (2011).
4. R. Ng, M. Levoy, M. Bredif, G. Duval, M. Horowitz, and P. Hanrahan, *Light Field Photography with a Hand-Held Plenoptic Camera* (2005).
5. M. Levoy, R. Ng, A. Adams, M. Footer, and M. Horowitz, "Light field microscopy," in *ACM SIGGRAPH 2006 Papers, SIGGRAPH '06* (2006), pp. 924-934.
6. N. Antipa, G. Kuo, R. Heckel, B. Mildenhall, E. Bostan, R. Ng, and L. Waller, "DiffuserCam: lensless single-exposure 3D imaging," Optica 5, 1 (2018).
7. M. S. Asif, A. Ayremlou, A. Veeraraghavan, R. Baraniuk, and A. Sankaranarayanan, "FlatCam: Replacing Lenses with Masks and Computation," in *Proceedings of the IEEE International Conference on Computer Vision* (2016), Vol. 2016—Febru, pp. 663-666.
8. A. Levin, R. Fergus, F. Durand, and W. T. Freeman, "Image and depth from a conventional camera with a coded aperture," in *Proceedings of the ACM SIGGRAPH Conference on Computer Graphics* (2007).
9. S. R. P. Pavani, M. A. Thompson, J. S. Biteen, S. J. Lord, N. Liu, R. J. Twieg, R. Piestun, and W. E. Moerner, "Three-dimensional, single-molecule fluorescence imaging beyond the diffraction limit by using a double-helix point spread function," Proc. Natl. Acad. Sci. U.S.A 106, 2995-2999 (2009).
10. P. Llull, X. Yuan, L. Carin, and D. J. Brady, "Image translation for single-shot focal tomography," Optica 2, 822 (2015).
11. M. Takeda, H. Ina, and S. Kobayashi, "Fourier-transform method of fringe-pattern analysis for computer-based topography and interferometry," J. Opt. Soc. Am. 72, 156-160 (1982).
12. https://www.osapublishing.org/ol/abstract.cfm?uri=ol-45-7-1734. Optics letters Vol 45, Issue 7, p 1734 (Single Shot surface 3D imaging by optical coherence factor by Jian Xu et al.).

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. An apparatus useful for 3-D imaging, comprising:
   means for interfering a reference wavefront with a sample wavefront comprising a reflection from different locations on a surface of an object, so as to form an interference comprising an intensity distribution having an intensity contrast varying as a function of path length differences between the different locations on the surface and the reference wavefront; and
   a computer determining:
      from intensity data comprising the intensity distribution, a plurality of coherence factors measuring the intensity contrast between a first intensity of a first region of the interference, comprising constructive interference between the sample wavefront and the reference wavefront, and a second intensity of a second region of the interference, comprising destructive interference between the sample wavefront and the reference wavefront, and
      from the coherence factors, height data comprising heights of the surface with respect to an x-y plane perpendicular to the heights and as a function of the coordinates of locations in the x-y plane, wherein the height data is used for generating a three dimensional (3-D) image of the surface.

2. The apparatus of claim 1, wherein the means for interfering comprises:
an imaging system including an image sensor capturing the intensity distribution as a function of the different locations at different positions on the image sensor;
a source of coherent electromagnetic radiation; and
optical elements:
(1) splitting the coherent electromagnetic radiation into a sample beam comprising the sample wavefront and a reference beam comprising the reference wavefront,
(2) matching path lengths traveled by the sample beam and the reference beam so as to form the intensity distribution, and
(3) guiding and collecting the sample wavefront and the reference wavefront onto the image sensor.

3. The apparatus of claim 1, wherein:
the means for interfering obtains a coherence profile comprising the coherence factors when the surface comprises a flat surface of a mirror, the flat surface including the x-y plane and the coherence factors including source coherence factors each comprising a measure of the intensity contrast as a function of the path length differences from the x-y plane to the reference wavefront as a function of position of the x-y plane along the optical axis of the sample wavefront;
the means for interfering obtains the coherence factors when the surface comprises a non-planar surface of the object being imaged, the coherence factors comprising sample coherence factors comprising a plurality of values; and
the computer determines the height data by:
locating the values of the sample coherence factors in the coherence profile and selecting a set of the path length differences associated with each of the plurality of values according to the coherence profile; and
obtaining the height data from the set of the path length differences.

4. The apparatus of claim 3, wherein:
the means for interfering comprises an imaging system having a depth of view and a field of view,
the sample wavefront and the reference wavefront are generated from coherent electromagnetic radiation having a coherence length matching or commensurate with the depth of view so that the heights are within the depth of view,
the path length differences are all negative or all positive so that the field of view is entirely within a monotonic region of the coherence profile, and
a contribution to the coherence factors caused by a tilt between the sample wavefront and the reference wavefront is removed by removing a slope of constant gradient from the height data.

5. The apparatus of claim 1, wherein:
the interference comprises DC terms and an interference term, and
the computer:
determines a Fourier transform of the interference,
identifies a portion of the Fourier transform associated with the interference term,
converts the portion into the interference term, and
calculates the coherence factors by dividing the interference term by a divisor associated with a first intensity of the sample wavefront and a second intensity of the reference wavefront.

6. The apparatus of claim 1, wherein:
the sample wavefront and the reference wavefront are generated from a single pulse of coherent electromagnetic radiation, and
the three dimensional image is formed from a single frame or snap-shot of the first interference obtained from the single pulse.

7. The apparatus of claim 1, wherein the sample wavefront and the reference wavefront are off-axis relative to one another.

8. The apparatus of claim 1, further comprising a display displaying the 3-D image.

9. The apparatus of claim 1, wherein the coherence factors are used to resolve the heights in a range from 1 micrometer to 1 meter when the locations are separated by a distance in a range of 10 nanometers to 1 meter.

10. The apparatus of claim 1, wherein the means for interfering comprises: an imaging system including an image sensor capturing the intensity distribution as a
function of the different locations at different positions on the image sensor; a source of coherent electromagnetic radiation; and
optical elements comprising:
(4) a beamsplitter splitting the coherent electromagnetic radiation into a sample beam comprising the sample wavefront and a reference beam comprising the reference wavefront,
(5) a mirror matching path lengths traveled by the sample beam and the reference beam so as to form the intensity distribution, and
(6) one or more lenses guiding and collecting the sample wavefront and the reference wavefront onto the image sensor.

11. A device, comprising:
a computer or one or more circuits;
determining:
a plurality of coherence factors measuring an intensity contrast between a first intensity of a first region of an interference comprising constructive interference between a sample wavefront and a reference wavefront, and a second intensity of a second region of the interference comprising destructive interference between the sample wavefront and the reference wavefront, the interference between the reference wavefront and a reflection of the sample wavefront from different locations on a surface of an object, and
from the coherence factors, height data comprising heights of the surface with respect to an x-y plane perpendicular to the heights and as a function of the coordinates of the locations in the x-y plane, wherein
the height data is useful for generating a three dimensional image of the surface; and
at least one of an imaging system or an interferometer comprising or coupled to the computer or the one or more circuits, the at least one of the imaging system, comprising a sensor, or the interferometer generating the interference and outputting intensity data, comprising the first intensity and the second intensity, to the computer or the one or more circuits.

12. The device of claim 11, wherein the computer or the one or more circuits obtain:
the coherence factors including source coherence factors each comprising a measure of the intensity contrast as a function of path length differences from the x-y plane to the reference wavefront as a function of position of the x-y plane along the optical axis of the sample wavefront;

the coherence factors when the surface comprises a non-planar surface of the object being imaged, the coherence factors comprising sample coherence factors comprising a plurality of values; and the computer or the one or more circuits determine the height data by:

locating the values of the sample coherence factors in a coherence profile and selecting a set of the path length differences associated with each of the plurality of values according to the coherence profile; and obtaining the height data from the set of the path length differences.

13. The device of claim 11, wherein:

the imaging system comprises a camera or an imaging sensor comprising or coupled to the computer or the one or more circuits of claim 11, the camera or the imaging sensor recording the interference and outputting the intensity data;

the height data is obtained from the coherence factors by associating the height data with path length differences from the x-y plane to the reference wavefront; and the path length differences are obtained from a database comprising a correspondence between the coherence factors and the path length differences.

14. The device of claim 11, wherein the computer or the one or more circuits comprise at least one of a single chip comprising a processor, an application specific integrated circuit, or a field programmable gate array.

15. A method of imaging, comprising:

forming intensity data comprising an intensity distribution of an interference, using at least one of an interferometer or an imaging system; and receiving the intensity data in a computer or one or more circuits, wherein:

the interference is between a reference wavefront and a sample wavefront comprising a reflection from different locations on a surface of an object, and the intensity distribution is a function of path length differences between the different locations on the surface and the reference wavefront;

determining, in the computer or the one or more circuits, coherence factors comprising an intensity contrast of the intensity distribution as a function of the different locations; and determining, in the computer or the one or more circuits, height data from the coherence factors, the height data comprising heights of the surface with respect to an x-y plane perpendicular to the heights and as a function of the coordinates of the different locations in the x-y plane, wherein the height data is used for generating a three dimensional image of the surface.

16. The method of claim 15, wherein forming the intensity data further comprises:

splitting coherent electromagnetic radiation into a sample beam comprising the sample wavefront and a reference beam comprising the reference wavefront;

interfering the sample beam and the reference beam so as to form the interference;

matching path lengths traveled by the sample beam and the reference beam so as to form the intensity distribution;

guiding and collecting the sample wavefront and the reference wavefront onto an image sensor; and capturing the intensity distribution as a function of the different locations at different positions on the image sensor.

17. The method of claim 16, wherein the interference comprises DC terms and an interference term, the method further comprising:

determining a Fourier transform of the intensity distribution;

identifying a portion of the Fourier transform associated with the interference term converting the portion into the interference term; and calculating the coherence factors by dividing the interference term by a divisor associated with a first intensity of the sample wavefront and a second intensity of the reference wavefront.

18. The method of claim 17, wherein:

the coherent electromagnetic radiation comprises a single pulse, and the three dimensional image is formed from the interference and the Fourier transform obtained using the single pulse.

19. The method of claim 16, further comprising:

obtaining a coherence profile comprising the coherence factors when the surface comprises a flat surface of a mirror, the flat surface including the x-y plane and the coherence factors including source coherence factors each comprising a measure of the intensity contrast as a function of the path length differences from the x-y plane to the reference wavefront as a function of position of the x-y plane along the optical axis of the sample wavefront;

obtaining the coherence factors when the surface comprises a non-planar surface of the object, the coherence factors comprising sample coherence factors comprising a plurality of values; and the computer determining the height data by:

locating the values of the sample coherence factors in the coherence profile and selecting a set of the path length differences associated with each of the plurality of values according to the coherence profile; and obtaining the height data from the set of the path length differences.

20. The method of claim 16, wherein the image sensor has a depth of view and a field of view, the sample wavefront and the reference wavefront are generated from coherent electromagnetic radiation having a coherence length matching or commensurate with the depth of view so that the heights are within the depth of view, the path length differences are all negative or all positive so that the field of view is entirely within a monotonic region of the coherence profile, and a contribution of a tilt between the sample wavefront and the reference wavefront is removed by removing a slope of constant gradient from the height data.

21. The method of claim 15, wherein the computer or the one or more circuits comprise at least one of a single chip comprising a processor, an application specific integrated circuit, or a field programmable gate array.

* * * * *